3,772,409
Patented Nov. 13, 1973

3,772,409
THERMOPLASTIC COMPOSITIONS BASED ON HIGHLY CRYSTALLINE VINYL CHLORIDE POLYMERS
Luciano Scarso, Milan, Egidio Cerri, Mestre, and Giovanni Pezzin, Padova, Italy, assignors to Montecatini Edison S.p.A., Milan, Italy
No Drawing. Continuation-in-part of abandoned application Ser. No. 826,695, May 21, 1969. This application Sept. 2, 1971, Ser. No. 177,449
Claims priority, application Italy, May 22, 1968, 16,792/68
Int. Cl. C08f 29/24
U.S. Cl. 260—876 R           6 Claims

ABSTRACT OF THE DISCLOSURE

Thermoplastic compositions based on highly crystalline vinyl chloride polymers and characterized by high heat-resistance, easy processability, and increased or reinforced impact strength are disclosed.

The new compositions comprise (A) highly crystalline vinyl chloride polymers which exhibit syndiotactic steric structure (SPVC); (B) copolymers of methyl-methacrylate and alpha-methylstyrene (MMA-αMS); and (C) an elastomeric polymeric material which may be a graft copolymer of styrene-methylmethacrylate onto a polybutadiene rubber (MBS), a graft copolymer of vinyl chloride onto an elastomeric ethylene/propylene copolymer (PVC-olefin), or a graft copolymer of vinyl chloride onto chlorinated polyethylene (PVC-PECl).

---

This application is a continuation-in-part of our application Ser. No. 826,695, filed May 21, 1969, now abandoned.

PRIOR ART

It is known that highly crystalline polyvinylchloride [prepared, for example, by polymerizing vinyl chloride at temperatures below 0° C., in contact with selected catalysts usually of the radicalic type] shows a remarkable improvement, even at high temperatures, in its heat-resistance, such as in the Vicat penetration temperature, in the deformation temperature under constant load, in the extent of shrinkage in boiling water, and in its resistance to solvents, as compared to PVC obtained by polymerized vinyl chloride in contact with the same catalysts but at temperatures around 50° C., which exhibits relatively low crystallinity and is here referred to as "normal PVC."

It is also known that the increased crystallinity of the PVC obtained at the polymerization temperatures below 0° C. has an unfavorable affect on other characteristics of the polymer, most notably on the processability of the polymer and its resistance to impact. Both the impact processability and shock resistance of the highly crystalline polymers are inferior to those characteristics of the "normal" polyvinylchlorides which exhibit a relatively low percent of crystallinity on X-ray examination.

THE PRESENT INVENTION

One object of this invention is to provide new thermoplastic compositions based on highly crystalline vinyl chloride polymers, which compositions not only have a high heat-resistance but, in addition, can be processed very easily on the standard equipment used for processing the "normal" PVC, to obtain manufactured shaped articles which are heat resistant and have very good impact-resistance.

This and other objects are accomplished according to the present invention by providing compositions which consist of the following ingredients or components:

(A) Highly crystalline polyvinyl chloride (SPVC) having a syndiotaxia index higher than 1.8, preferably from 1.8 to 2.4, and further characterized in having an intrinsic viscosity of from 0.5 to 2.0 dl./g., a second-order glass transition temperature above 80° C., and a penetration Vicat temperature above 85° C.;

(B) A copolymer of methylmethacrylate and α-methyl styrene (MMA-αMS) containing, by weight, from 20 to 50 parts of methyl-methacrylate and from 50 to 80 parts of α-methylstyrene; and (C) A polymeric elastomeric material which is a graft copolymer of styrene-methylmethacrylate as in (B), onto a polybutadiene rubber; a graft copolymer of vinyl chloride onto an amorphous, elastomeric copolymer of ethylene and propylene containing from 20% to about 80% of ethylene, said graft copolymer containing by weight, from 60% to 95% of polymerized vinyl chloride; or a graft copolymer of vinyl chloride onto chlorinated polyethylene and containing, by weight, from 70% to 95% of polymerized vinyl chloride.

The compositions comprise, by weight per 100 parts thereof, from 50 to 95 parts of (A); from 5 to 45 parts of (B); and from 5 to 45 parts of (C).

The compositions, or the components used to prepare the final compositions, can also contain non-polymeric adjuvants, such as light and heat stabilizers, antioxidants, plasticizers, mineral fillers, lubricants, release agents and similar additives known in the art.

The new thermoplastic compositions can be prepared by mechanically mixing all of the components on a conventional ribbon mixer or, preferably, in a fast mixer of the Henschel type, to facilitate mutual dispersion of the components as much as possible. Where non-polymeric additives are to be included, such as stabilizers, lubricants, release agents, antioxidants, etc., a dispersion thereof may be prepared separately, added to the dispersion of the polymeric materials, and the whole mass subjected to further mixing according to one of the methods mentioned. The mixture thus obtained (dry-blend) is then worked at high temperature, for instance at 180° C. to 220° C., on a roller mixer or a Banbury-type mixer, until a homogeneously fused mass is obtained. This mass may then be laminated into sheets which, after cooling, may be granulated into dice-like granules. The cooled sheets may be used for preparing samples to be subjected to various tests.

The powdery phase (dry-blend) may be extruded directly through a strainer head having small holes and fitted with a cutting blade, to obtain the composition in an intermediate granular form which is easily handled. The dice-like or lentil-like, granules can be transformed into manufactured, shaped articles on standard processing machines and using specific technologies depending on the particular type of shaped articles being manufactured.

The following examples are given to illustrate the invention but are not intended to be limiting.

EXAMPLES I to X

Thermoplastic compositions were prepared having the compositions shown in (I–X) in the following table, and in which, the type and quantity of non-polymeric additives remaining the same, different quantities of polymeric materials and different components (C) were used in admixture with the highly crystalline polyvinylchloride having syndiotactic steric structure (SPVC). Run A of the table is given for comparison.

TABLE

| Component: | Run A | I | II | III | IV | V | VI | VII | VIII | IX | X |
|---|---|---|---|---|---|---|---|---|---|---|---|
| SPVC [1] | 100 | 90 | 85 | 80 | 55 | 85 | 80 | 60 | 85 | 80 | 60 |
| MMA-MS [2] |  | 10 | 5 | 10 | 45 | 5 | 10 | 10 | 5 | 10 | 10 |
| MBS [3] |  |  | 10 | 10 |  |  |  |  |  |  |  |
| PVC-olefin [4] |  |  |  |  |  | 10 | 10 | 30 |  |  |  |
| PVC-PECl [5] |  |  |  |  |  |  |  |  | 10 | 10 | 30 |
| Thermal stabilizer [6] | 2.9 | 2.9 | 2.9 | 2.9 | 2.9 | 2.9 | 2.9 | 2.9 | 2.9 | 2.9 | 2.9 |
| Lubricant [7] | 1.0 | 1.0 | 1.0 | 1.0 | 1.0 | 1.0 | 1.0 | 1.0 | 1.0 | 1.0 | 1.0 |
| Mineral filler [8] | 5.3 | 5.3 | 5.3 | 5.3 | 5.3 | 5.3 | 5.3 | 5.3 | 5.3 | 5.3 | 5.3 |
| Properties: |  |  |  |  |  |  |  |  |  |  |  |
| Vicat temperature, °C.[7] | 97 | 100 | 96 | 97 | 110 | 97 | 97 | 94 | 97 | 99 | 94 |
| Resilience Izod at 23° C., kg. cm./cm.[7] | 2 | 2 | 2.9 | 3.2 | 2 | 2.5 | 2.5 | 5 | 2.8 | 2.8 | 4.8 |
| Viscosity in the molten state in poises×10$^5$ at $\gamma$=100 sec.$^{-1}$: |  |  |  |  |  |  |  |  |  |  |  |
| T.=180° C | 1.06 | 0.85 | 0.80 | 0.70 | 0.75 | 0.7 | 0.68 | 0.55 | 0.73 | 0.70 | 0.54 |
| T.=200° C | 0.72 | 0.59 | 0.54 | 0.50 | 0.55 | 0.5 | 0.45 | 0.38 | 0.51 | 0.47 | 0.37 |

[1] The crystalline SPVC used had the following characteristics:
Index of syndiotaxia _____ 2.3
Intrinsic viscosity _____ 0.95 dl./g.
Glass transition temperature of the 2d order _____ 100° C.

NOTE.—The syndiotaxia index was determined by measurement of the I.R. absorption spectra; see Fordham, Burleigh & Struck, J. Polymer Science, vol. 41, 1959, pp. 73–82. The intrinsic viscosity (as the indication of the average molecular weight of the PVC) was determined in a diluted solution of cyclohexane at 25° C; see Danusso and Moraglio, La Chimica e l'Industria, vol. 36, p. 883, 1954. The second order glass transition temperature was determined as described by C. Garbuglio, R. Rodella, G. C. Borsini and G. Gallinella, La Chimica e l'Industria, vol. 46, p. 166, 1964.

[2] The MMA-MS used had the following properties:
Specific weight _____ 1.16 g./cc.
Heat distortion temperature (264 p.s.i.) _____ 121° C.
Izod resilience at 23° C _____ 1.5 kg. cm./cm.
Rockwell Hardness "M" _____ 102–105.

[3] The MBS used was a graft copolymer of styrene-methylmethacrylate (75:25) onto a polybutadiene rubber.

[4] The PVC-olefin used was a graft copolymer of vinyl chloride onto an elastomeric ethylene-propylene copolymer prepared by grafting vinyl chloride onto an ethylene-propylene copolymer having an intrinsic viscosity in toluene at 30° C. of 1.65 dl./g. and a chemically combined propylene content of 67.5 molar percent. The content of ethylene-propylene copolymer in the graft copolymer was about 8% by weight. The graft copolymer had the following properties:
Vicat temperature (ASTM D 1525–58 T) _____ 81° C.
Izod resilience (ASTM D 526–56) _____ 11 kg. cm./cm.
Rockwell Hardness "L" (ASTM D 785–62) _____ 81.

[5] The PVC-PECl used was a graft copolymer of vinyl chloride onto chlorinated polyethylene containing 10% by weight of a chlorinated polyethylene commercially available under the trade designation LD 184 (Du Pont, U.S.A.) and 90% of chemically combined vinyl chloride.

[6] The thermal stabilizer used was barium-cadmium stabilizer in admixture with lead stearate and epoxyoctyl stearate.

[7] The lubricant used was a mixture of calcium stearate and vaseline oil.

[8] The mineral filler consisted of titanium dioxide mixed with calcium carbonate.

NOTE.—The non-polymeric additives were of the type used conventionally in preparing compositions based on the "normal" PVC of low crystallinity and obtained by polymerizing vinyl chloride at the temperatures around 50° C.

In preparing the thermoplastic compositions reported in the table, the components were mixed for about 15 minutes in a fast-running mixer, which was the time required for the mass to attain a temperature of 100 to 110° C.

The mixtures were then cooled to 30–40° C., under low-speed stirring, and over a time period of about 15 minutes.

The dry-blends thus obtained were then processed in a mill-roll for a total time of about 10 minutes, at a temperature of from 185° C. to 200° C. The resulting raw calendered sheets were used to prepare specimens of different shapes and sizes, depending on the physical property to be determined.

[Note: The Vicat softening temperature shown in the table for the various compositions was determined according to revised ASTM-D-1552-58, adopting a 5.0 kg. load, i.e., in conformity with the VDE 0302 II rules, on specimens prepared by fixing 80 g. of the raw calendered sheet on a frame measuring 127 x 127 x 6.2 mm., and subjecting the sheet on the frame for 5 minutes to a pressure of 150 atm. in a vertical multiplate press (250 x 250 mm.) heated at 180–190° C.; the small plate had a thickness of 6.0 mm.; the test specimens obtained from said plate had the dimensions 35 x 35 x 6 mm.; the impact resistance of the compositions (A) and I to X was determined according to ASTM-D-256-56 T on test specimens having the dimension 63.5 x 12.7 x 6 mm., provided with a special V-notch, and obtained by milling a small plate 6.0 mm. thick prepared in the same manner as the small plate from which the specimens for the Vicat test were obtained. The processability of the thermoplastic compositions (A) and I to X, based on measurement of the viscosity of the composition in the molten state, was determined using an extrusion capillary rheometer of the MCR type manufactured by Instron, mounted on an electronic Instron dynamometer of the TT-CM type (see Materie Plastiche, August 1962, May 1963, p. 1042), which was provided with a cylindrical orifice having a diameter D=1.52 mm. and a length/diameter ratio L/D=33, and in which the granular compositions were examined and through which the compositions were extruded at 180° C. The determination involved the following procedures:

loading of the rheometer with 20–30 g. of the granular composition to be examined;

compression of the granular material at 100–200 kg./cm.$^2$ for 5 minutes necessary to reach the thermal equilibrium;

extrusion of the material at constant speeds comprised between 0.1 and 50 cm./minute, corresponding to a range of flow gradient comprised between 3.5 and 1760 sec.$^{-1}$;

automatic recording of the required power of extrusion;

measuring of the approximate friction resistance at empty chamber, at all the test speeds; and plotting of the diagram of the viscosity as function of the flow gradient and interpolation of the viscosity value at gradient $\gamma$=100 sec.$^{-1}$.

(Presentation of the data according to ASTM-D-1703 standards).]

As is quite evident from a comparison of the data reported in the table, the compositions according to this invention (compositions I to X) are surprisingly endowed with both good processability (note the value of the viscosity in the molten state for compositions I–X is considerably lower than that of the crystalline polyvinylchloride per se), and with high thermal resistance characteristics (note the values of the Vicat penetration temperatures for compositions I–X are similar to that of the crystalline polyvinyl-chloride per se).

The combination of the two characteristics (good processability and high heat resistance) makes it possible to conveniently use the new thermoplastic compositions of the invention in the manufacture of shaped articles to be used under conditions requiring the high heat resistance which it is difficult to attain using thermoplastic polymeric compositions based on the normal or conventional polyvinylchloride of relatively low crystallinity.

In addition, the new thermoplastic compositions of this invention have an impact resistance which, in practically all cases, is superior to the impact resistance of the highly crystalline polyvinylchloride and closer to that of normal polyvinylchloride which means the new compositions are also adapted to the manufacture of shaped articles for uses which are typical for normal polyvinylchloride.

The thermoplastic compositions of the invention, which present the combination of good processability and impact resistance of highly crystalline polyvinylchloride, without alteration of its heat resistance, have a very wide range of utilities.

Pipes, profiles, rods, filaments, films, sheets, bottles, embossed sheets, fittings, joints and other similar manufactured shaped articles may be prepared by extrusion, calendering and injection processes of polymeric materials based on the polymeric thermoplastic compositions according to the present invention employing the conventional equipments well known to those skilled in the art.

Some changes in details can be made in practicing the invention without departing from the spirit thereof. Therefore, we intend to include in the scope of the appended claims all such variations and modifications as will be obvious to those skilled in the art from the description and working examples given herein.

We claim:

1. Thermoplastic compositions based on highly crystalline polyvinylchloride which exhibits syndiotactic steric structure, and the essential components of which compositions are, by weight per 100 parts thereof, from 50 to 95 parts of
   (A) a highly crystalline polyvinylchloride having a syndiotactic index between about 1.8 and about 2.4;
   (B) from 5 to 45 parts of a copolymer of methyl-methacrylate and alpha-methylstyrene containing, by weight, from 20 to 50 parts of methyl-methacrylate and from 50 to 80 parts of alpha-methylstyrene; and
   (C) from 5 to 45 parts of an elastomeric polymeric material selected from the group consisting of graft copolymers of styrene-methylmethacrylate as in (B) onto polybutadiene rubbers; graft copolymers of vinyl chloride onto elastomeric ethylene/propylene copolymers containing, by weight, from 20% to about 80% of ethylene, and which graft copolymers contain, by weight, from 60% to 95% of polymerized vinyl chloride; and graft copolymers of vinyl chloride onto chlorinated polyethylene containing, by weight, from 70% to 95% of polymerized vinyl chloride.

2. Thermoplastic compositions according to claim 1, in which component (C) is the graft copolymer of styrene-methylmethacrylate onto polybutadiene rubber.

3. Thermoplastic compositions according to claim 1, in which component (C) is the graft copolymer of vinyl chloride onto an elastomeric ethylene/propylene copolymer.

4. Thermoplastic compositions according to claim 1, in which component (C) is the graft copolymer of vinyl chloride onto chlorinated polyethylene.

5. Manufactured shaped articles of thermoplastic compositions according to claim 1.

6. Thermoplastic compositions according to claim 1 and further containing adjuvants used conventionally in the processing of plastic polymeric compositions.

References Cited

UNITED STATES PATENTS

| | | | |
|---|---|---|---|
| 3,328,490 | 6/1967 | Buning et al. | 260—899 |
| 3,341,628 | 9/1967 | Buning et al. | 260—899 |
| 3,689,598 | 9/1972 | Bierwirth et al. | 260—876 R |
| 2,791,600 | 5/1957 | Schwaegerle | 260—899 X |
| 3,018,268 | 1/1962 | Daly | 260—899 X |
| 3,463,833 | 8/1969 | Isogawa | 260—876 |
| 3,322,857 | 5/1967 | Coaker et al. | 260—876 |
| 3,520,953 | 7/1970 | Sugimoto et al. | 260—876 |

FOREIGN PATENTS

| | | | |
|---|---|---|---|
| 1,065,618 | 9/1959 | Germany | 260—876 |
| 1,033,464 | 6/1966 | Great Britain | 260—899 |

MURRAY TILLMAN, Primary Examiner

J. SEIBERT, Assistant Examiner

U.S. Cl. X.R.

260—41 B, 45.75 R, 92.8 R, 878 R, 899

UNITED STATES PATENT OFFICE
CERTIFICATE OF CORRECTION

Patent No. 3,772,409           Dated November 13, 1973

Inventor(s) Luciano SCARSO et al

It is certified that error appears in the above-identified patent and that said Letters Patent are hereby corrected as shown below:

Col. 3, line 10 of the Note,

" MMA-MS " should be - - - MMA-$\alpha$ MS - - -.

Signed and sealed this 7th day of January 1975.

(SEAL)
Attest:

McCOY M. GIBSON JR.
Attesting Officer

C. MARSHALL DANN
Commissioner of Patents